United States Patent
Konishi et al.

(10) Patent No.: US 6,640,056 B2
(45) Date of Patent: Oct. 28, 2003

(54) CAMERA FOR DRIVING LENS UNIT REMOVABLY ATTACHED THERETO AND METHOD FOR CONTROLLING DRIVE THEREBETWEEN

(75) Inventors: Yoshito Konishi, Sakai (JP); Atsutaka Ito, Sakai (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/933,127

(22) Filed: Aug. 21, 2001

(65) Prior Publication Data

US 2002/0025147 A1 Feb. 28, 2002

(30) Foreign Application Priority Data

Aug. 23, 2000  (JP) ........................ 2000-252347

(51) Int. Cl.[7] ............... G03B 7/10; G03B 9/02
(52) U.S. Cl. ....................... 396/259; 396/508
(58) Field of Search ................ 396/258, 259, 396/261, 508, 463, 257; 348/363

(56) References Cited

U.S. PATENT DOCUMENTS

| | | | |
|---|---|---|---|
| 4,396,271 A | 8/1983 | Hiraike | |
| 4,538,893 A | 9/1985 | Nakano et al. | |
| 4,681,417 A | 7/1987 | Fujino et al. | |
| 4,745,425 A | 5/1988 | Kusaka | |
| 4,959,728 A | * 9/1990 | Takahashi et al. | 348/363 |
| 5,543,878 A | 8/1996 | Murakami | |
| 6,104,880 A | * 8/2000 | Kamishita et al. | 396/133 |

FOREIGN PATENT DOCUMENTS

| | | |
|---|---|---|
| JP | 58-224336 | 12/1983 |
| JP | 07-181573 | 7/1995 |
| JP | 08-095145 | 4/1996 |

* cited by examiner

*Primary Examiner*—Russell Adams
*Assistant Examiner*—Arthur A Smith
(74) *Attorney, Agent, or Firm*—McDermott, Will & Emery

(57) ABSTRACT

A photographing apparatus suitable for fixing an optical unit thereto, and a method for controlling a device in the unit from the apparatus. The apparatus includes: a unit fixing portion for fixing the unit thereto; a driver which runs the device in the unit; a controller which controls the driver and includes a primary controller; and a detector which finds running properties of the driver. The primary controller makes the driver work before an aimed running so as to run the device in the unit up to a set amount in a set timing, and makes the detector find running properties of the driver at the same time. During the aimed running, the controller makes the driver work, referencing to running properties found by the detector.

8 Claims, 13 Drawing Sheets

CAMERA FOR DRIVING LENS UNIT REMOVABLY ATTACHED THERETO AND METHOD FOR CONTROLLING DRIVE THEREBETWEEN

This application is based upon application No. 2000-252347 filed in Japan, the contents of which are hereby incorporated by reference.

BACKGROUND OF THE INVENTION

1. Field of the Invention

The present invention relates to a device having a unit, which can be attached to or removed from a body of the device, such as a camera having an interchangeable lens, and relates to a method for controlling the unit from the body of the device. More specifically, the present invention relates to an equipment in the device for driving a driven member in the unit by means of a driving source provided in the body, and relates to the method for controlling the driven member from the equipment.

2. Description of the Related Arts

Conventionally, there have been proposed some camera systems, in which an aperture in a lens is driven by a camera.

For example, as for a camera provided with a motor, Japanese Non-examined Patent Publication No. 58-224336 discloses a technique that realizes non-provision of the urging means for resetting an aperture device in a lens, by making use of charging operation which makes the aperture device execute its resetting operation. It is disclosed therein that the aperture device is driven by a motor in a camera and stopped by a magnetic mechanism, and that a ring for driving the aperture device is urged in one direction in a connecting part between the camera body and the lens.

In U.S. Pat. No. 4,681,417, it discloses a technique that a small and low power motor only for actuating an aperture device in an interchangeable lens is equipped in a camera body. It is disclosed therein that a linear driving lever in the camera body and an aperture driving lever in the lens are provided for connecting parts between the body and the lens, and that its stopping position of the aperture device is detected by the lens.

In Japanese Non-examined Patent Publication No. 8-95145, it discloses a technique of lens changeable camera disposed at predetermined positions in a lens mount portion, in which an aperture driving mechanism and a focus driving mechanism are connected with two pairs of couplers, each having a key at a tip thereof. Engagement in a connecting portion is realized by at least one revolution (or rotation) of the couplers, and it is not necessary to align a mechanism of an interchangeable lens. Thus, the technique is suitable for an aperture driving system without urging springs, but retreating mechanism and the like are needed in order to disengage it from the connecting portion.

As for a driving mechanism driven and stopped by a motor, an overrun is necessarily occurred from a point of starting brake to a point of stopping. Main reasons of the overrun are stopping characteristics of the motor or a driving source, construction of the driving mechanism such as gear ratio and transfer property, load or inertia of driven members and so on.

As for control, the technique that driving operation started a little earlier (or ahead of time) in consideration of the delay of control system, is known.

For example, in U.S. Pat. No. 4,396,271, it is disclosed that calculating of moving distance of a movable aperture member, and starting to stop an aperture device when the aperture member arrives at calculated distance short of an object position (or target position) corresponding to aperture value, allow for precise aperture control.

In U.S. Pat. No. 4,538,893, a driving mechanism for changing the size of an aperture, driven through an aperture associated member by a motor, is disclosed. In the driving system, the displacement amount of the aperture associated member is detected; a position signal and a rate signal are produced; and the aperture associated member is controlled to stop at an object position, by means of correcting the position signal responding to the rate signal.

As for common methods for predicting overrun of a motor by velocity detected before braking, it is disclosed, for example, in U.S. Pat. No. 5,543,878, that a film feeding apparatus, comprising a decelerating controller for decelerating film feeding velocity, a reverse drive brake for stopping to feed a film by reversing the motor, a velocity detector for detecting the film feeding velocity, and a brake controller for controlling the decelerating controller and the reverse drive brake. In this apparatus, the fluctuation in the rate of reducing the speed, namely deceleration, depending on some conditions, causes errors.

In U.S. Pat. No. 4,745,425, it is disclosed that a lens barrel having a optical system adjusting to focus automatically responding to a signal detected by a focus detect means, is provided with a storing means for storing information about load torque in the optical system, such as data about load and inertia, in order to change the condition of adjusting the optical system during automatic focusing. In the lens barrel, it is difficult to employ a lens having no data, and to correspond to every lens with individual difference, including change in characteristics accompanying aging.

In Japanese Non-examined Patent Publication No. 7-181573, a method for controlling a motor in a camera is disclosed. According to this method, the motor is controlled responding to a signal, corresponding to a revolution of the motor, output by an encoder, and a film is stopped at an object position, by means of adjusting the velocity of the motor so as to follow a brake line indicating a function of operation start point, which is predetermined, and the velocity of the motor. This stopping control tasks a controller, and therefor the controller, is too busy to perform the other controlling operation at one time.

In an inexpensive camera system using an interchangeable lens provided with no motor, a motor built in a camera body drives an aperture device in the lens, and a long link mechanism from the motor to a driven member of the aperture device is needed. In that system, a spring for urging an aperture control member is needed in order to prevent play in the long link mechanism and stabilize stopping characteristics thereof. The spring can be provided in the camera body or in the interchangeable lens. In case that the spring is not provided in the interchangeable lens, connecting members, provided in the interchangeable lens, for connecting between the camera body and the interchangeable lens are unsteady, and therefor an engaging member provided in the camera body needs to dodge connecting members when attaching the lens to the camera body. On the contrary, in case that the spring is provided in the interchangeable lens, one-way urging mechanism can be provided in the camera body, and connecting mechanism between the camera body and the interchangeable lens can be simplified.

In case that a DC motor in a camera body drives a mechanism including spring urging mechanism in a interchangeable lens, it is possible to drive it in both directions by means of supplying the DC motor with electricity, but it is difficult to keep it stopping against urging of the spring without supplying the DC motor therewith. Specifically, the DC motor has a small static force, consisting of magnetic cocking and frictional force, and therefore, a reduction ratio of a transfer mechanism must be large enough to keep stopping against the spring force only by means of the static force.

In case that the DC motor having a small inertia is used in order to shorten aperture drive time, cocking torque diminishes and therefor, the reduction ratio needs to be enlarged much more.

In case that a stepping motor is provided in a camera body, it is possible to keep stopping against spring force by means of continuing to supply the same magnetic poles of the motor with electricity, but the reduction ratio needs also to be enlarged because the torque produced by the stepping motor is usually small.

High reduction ratio enough to keep stopping against the spring force only by means of stopping the motor causes a problem of prolonging stop down operation time, because revolutions of a output axis of the motor for stopping down in a set amount increases. Stop down operation time is one of causes influencing release time lag, which is a delay time from a point of pushing a release button to actual exposure. Thus, it is desirable that stop down operation time is as short as possible.

Moreover, in case that a motor is provided not in an interchangeable lens but in a camera body, and that the motor is driven in both directions in order to continue to actuate the aperture device, conflicting problems are caused. One is operating time, and the other is accuracy of stopping position.

Specifically, in case that a reduction gear ratio from the motor in the camera body to an aperture device in the lens is made as small as possible while preventing the operation time from prolonging, the effects of tolerance increases. Therefore, for high accuracy of stopping position, it is needed that accelerating and decelerating characteristics related to all of the aperture driving mechanism with the motor is detected in order to adjust motor control so as to respond to the effects of tolerance.

However, it is difficult to predict the characteristics of the aperture driving mechanism, including indefinite interchangeable lenses, and moreover it is nearly impossible to consider variation of load condition caused by types of lenses and difference of individual lens, and variation of electric supply condition for the motor.

SUMMARY OF THE INVENTION

Accordingly, it is an object of the present invention to provide a camera, which can drive and stop a driven member in a lens precisely.

It is another object of the present invention to provide a method for controlling an apparatus adapted to attach a unit so as to drive and stop a driven member of the unit precisely.

In order to achieve the above objects, according to one aspect of the present invention, there is provided a camera adapted to attach a lens thereto, comprising: a lens attached part for attaching the lens thereto; a drive unit for driving a driven member in the lens attached to the lens attached part; a detector for detecting the operating characteristics of the drive unit; and a control unit for controlling the drive unit, wherein the control unit includes a preliminary drive control unit for driving the drive unit so as to drive the driven member in the lens by a predetermined amount with a predetermined timing, as a preliminary operation, and for making the detector detect the operating characteristics of the drive unit during the preliminary operation, and wherein the control unit controls the drive unit on the basis of the operating characteristics detected by the detector, as a main operation.

In the construction, depending on the operating characteristics of the drive unit detected by the detector during the preliminary operation, it is possible to grasp the influence of the variation of the loading condition in a driving system not only of a camera body but of a lens, and the influence of the variation of the power supply condition. In the main operation, it is possible to control the drive unit precisely, considering the operating characteristics detected during the preliminary operation.

Therefore, it is possible to drive and stop a driven member in a lens precisely.

As an embodiment, the control unit makes the detector detect at least one of the operating characteristics during the main operation, and the control unit controls the drive unit with reference to the at least one of the operating characteristics.

According to the embodiment, even if the characteristics of the drive unit change after the preliminary operation, it is possible to control the drive unit more precisely, considering at least one of the operating characteristics, for example, accelerating characteristic, detected during the main operation.

As another embodiment, the driven member is a member included in a mechanism for changing the size of an opening of an aperture in the lens attached to the lens attached part.

As still another embodiment, the predetermined timing corresponds to when it is detected that the lens is attached to the lens attached part.

As still another embodiment, the predetermined timing corresponds to when the electric power starts to be supplied to a camera body.

As still another embodiment, the predetermined timing corresponds to when a power switch on a camera body is switched on.

As still another embodiment, the detector detects the amount and time of operation of the drive unit, and the operating characteristics are those concerning the acceleration and deceleration of the drive unit, including a mechanical deflection and deviation.

According to another aspect of the present invention, there is provided a method for controlling an apparatus adapted to attach a unit thereto, comprising: a preliminary driving step for driving a driven member of the unit by a predetermined amount with a predetermined timing as a preliminary driving operation; a detecting step for detecting operating characteristics of a mechanism for driving the driven member during the preliminary driving operation; and a main driving step for driving the driven member as a main driving operation, on the basis of the operating characteristics detected in the detecting step.

According to the method, it is possible to drive and stop a driven member of the unit precisely.

BRIEF DESCRIPTION OF THE DRAWINGS

These and other objects and features of the present invention will become clear from the following description taken in conjunction with the preferred embodiment thereof with reference to the accompanying the drawings.

DETAILED DESCRIPTION OF THE PREFERRED EMBODIMENT

Figure 1:
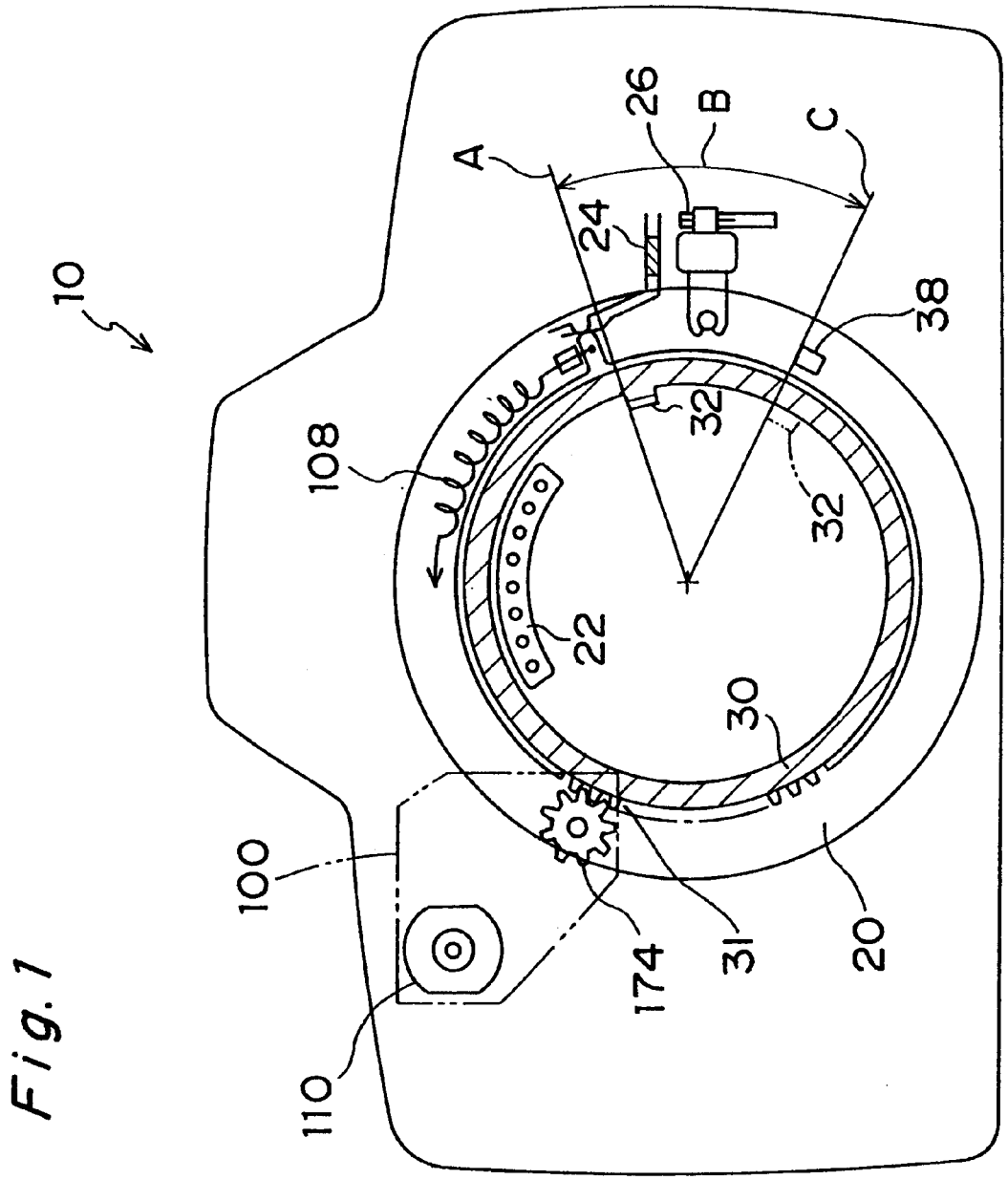
FIG. 1 is a schematic diagram of a camera body according to an embodiment of the present invention.

Before the description of the preferred embodiment according to the present invention proceeds, it is to be noted that like or corresponding parts are designated by like reference numerals throughout the accompanying drawings.

A detailed description is made below upon a camera of the preferred embodiment, with reference to FIG. 1 through FIG. 13.

FIG. 1 shows an outline of construction of an aperture driving mechanism in a camera body 10 of the camera.

The camera body 10 comprises a mount 20 for fixing an interchangeable lens thereto, and an aperture driving ring 30. The aperture driving ring 30 has an aperture driving lever 32 for driving an aperture member having an aperture in fixed interchangeable lens from the camera body 10. Inside of the aperture driving ring 30, a signal terminal 22, for electrically connecting with a signal terminal in the interchangeable lens, is arranged. Near the mount 20, a lens fixing operation detecting switch 26, for detecting the attaching and detaching operation of the interchangeable lens, is arranged.

The aperture driving ring 30 is driven by an aperture motor 110, through an aperture driving mechanism 100. The aperture driving mechanism 100 comprises a reduction mechanism, a frictional brake mechanism, and an encoder, as described hereinafter. The aperture ring 30 rotates at an operation range B between an open end A and a stop down end C. A stopper 38 is arranged on a side of the stop down end C to prevent the aperture ring 30 from rotating beyond the stop down end C. An open detecting switch 24, for detecting whether the aperture driving ring 30 reaches to the open end A or not, is arranged on a side of the open end A. A spring 108, which is illustrated ideally, is loaded to force the aperture driving ring 30 to rotate toward the open end A.

Figure 2:
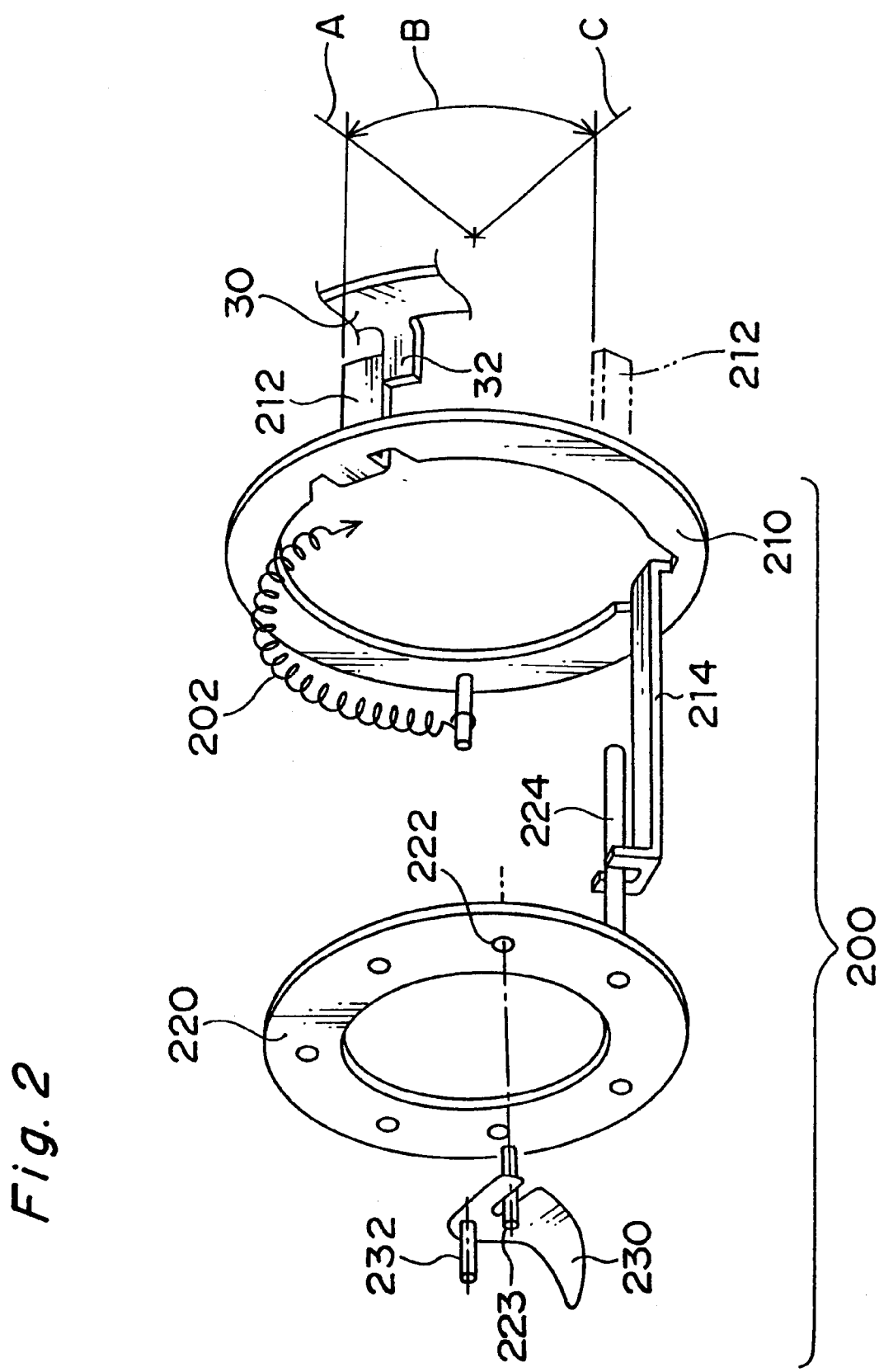
FIG. 2 is an exploded perspective view of an interchangeable lens to be attached to the camera body as shown in FIG. 1.

FIG. 2 shows the construction of an aperture driving mechanism in the interchangeable lens.

The aperture driving lever 32 of the aperture driving ring 30 in the camera body 10 engages an aperture driving lever 212, which protrudes from an aperture driving ring 210 in the interchangeable lens 200. The aperture driving lever 212 is urged or biased in a direction to close an aperture, which is referred as "stop down direction" hereinafter, by a spring 202 in the interchangeable lens 200. Resisting the aperture driving lever 212 urged by the spring 202, the aperture driving lever 32 in the camera body 10 can rotate in a direction to open the aperture, which is referred as "aperture open direction" hereinafter.

The aperture driving ring 210 in the interchangeable lens 200 has an engaging fork 214, which extends in a direction of the optical axis. A tip of the engaging fork 214 engages a linkage pin 224, which projects out of a blade driving operation plate 220, so that the aperture driving ring 210 and the blade driving operation plate 220 rotate together. Blades 230, only one of which is shown in FIG. 2, are disposed circularly with respect to the blade driving operation plate 220 so as to make an opening in their center. A blade supporting plate (not shown) supports pins 232, only one of which is shown in FIG. 2. A pin 232 rotatably supports each blade 230. Blade driving pins 223, only one of which is shown in FIG. 2, projecting through a hole 222 in the blade driving operation plate 220, engage the blades 230. Rotation of the blade driving operation plate 220 changes the angle of the blades 230, and thereby a size of the opening, namely the aperture, changes.

Figure 3:
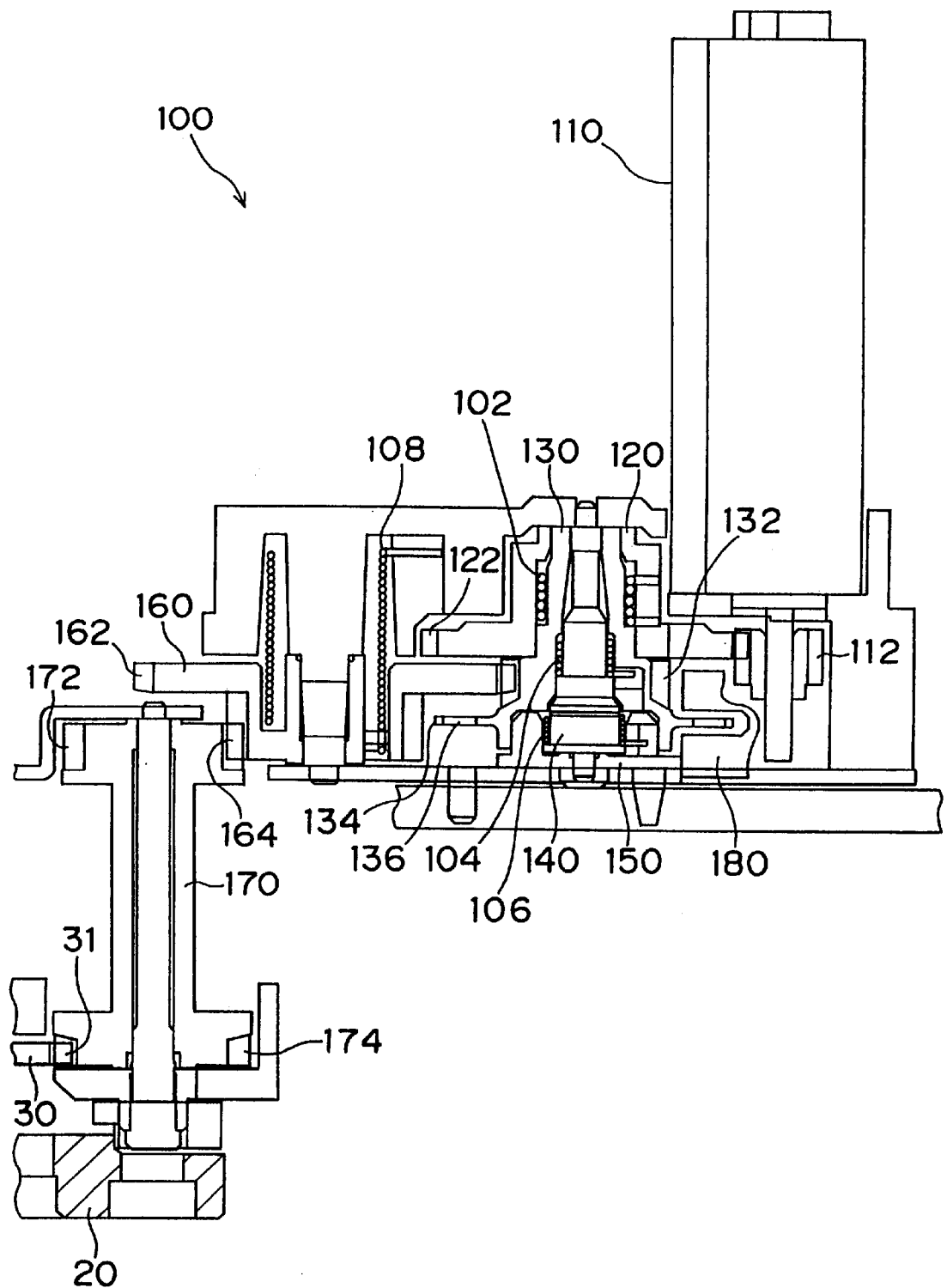
FIG. 3 is a sectional view of an aperture driving mechanism in the camera body shown in FIG. 1.

FIG. 3 shows the detailed construction of the aperture driving mechanism 100 disposed in the camera body 10.

The aperture driving ring 30 is coupled to an aperture motor 110 by means of an output gear 112, fixed on an output axis of the aperture motor 110, a first gear 120, a second gear 130, a third gear 160, and a transfer gear 170.

Specifically, a rotation axis 140, rotatably supported by a base member 150, is disposed near the aperture motor 110. The rotation axis 140 projects rotatably into the second gear 130. The top portion of the second gear 130 projects rotatably into the fist gear 120.

A stop down direction frictional brake spring 106 is provided between the base member 150 and the rotation axis 140. An open direction frictional brake spring 104 is provided between the rotation axis 140 and the second gear 130. An overload preventing spring 102 is provided between the second gear 130 and the first gear 120. As for the frictional brake springs 104 and 106, braking torque in one driving direction is set different from that in another driving direction, as described after.

The first gear 120 has a gear portion 122, which engages the output gear 112. The first gear 120 is coupled to the second gear 130, by means of the overload preventing spring 102, so that the first and second gear 120, 130 rotate together, if the torque is no greater than a set value.

The second gear 130 has a gear portion 132, which engages the third gear 160, and an encoder slit plate 134. The encoder slit plate 134 has plural slits 136, provided radially therein. A luminescence portion and two acceptance portions of a photo interrupter 180, or a sensor for a two-phase encoder are disposed opposite to each other, and the encoder slit plate 134 is put therebetween. The two acceptance portions detect the slits 136 in the encoder slit plate 134 in different phase, and thereby a direction of rotation of the encoder slit plate 134 can be detected.

The third gear 160 has a first gear portion 162 for engaging the gear portion 132 in the second gear 130, and a second gear portion 164 for engaging the transfer gear 170. The third gear 160 is urged in the open direction, by an open direction urging spring 108, which is illustrated ideally in FIG. 1.

The transfer gear 170 has a first gear portion 172 at an end thereof and a gear portion 174 at another end thereof. The second gear portion 174 engages the second gear portion 164 in the third gear 160. The second gear portion 174 engages the gear portion 31 in the aperture driving ring 30.

Each of the frictional brake springs 104, 106 has a coil portion winding around an axis, and arms extending radially from ends of the coil. When the arms are driven in winding direction of the coil, the coil is tightened. When the arms are driven in opposite direction, the coil is loosened. Thus, the frictional brake springs 104, 106 act as a so-called spring clutch.

Slipping torque setting values $T_{FO}$ of the frictional brake in the open direction and slipping torque setting value $T_{FC}$ thereof in the stop down direction are determined, depending on the torque of the spring in loosened direction. For driving in the open direction, the working torque is $T_{FO}$, because the open direction frictional brake spring 104 is loosened and the stop down direction frictional spring 106 is fastened. In the case, the rotation axis 140 stops rotating. For driving in the stop down direction, the working torque is $T_{FC}$, because the open direction frictional brake spring 104 is fastened and the stop down direction frictional spring 106 is loosened, while the rotation axis 140 is rotating together with the second gear 130.

Figure 4:
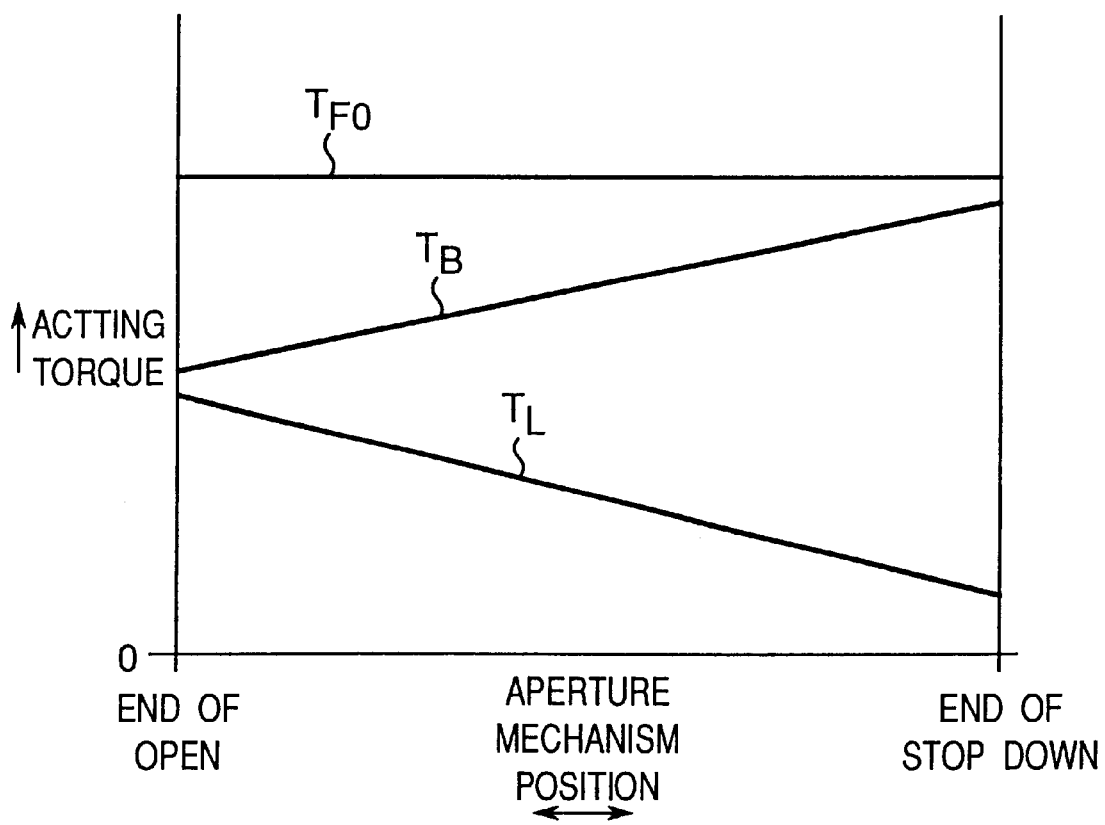
FIG. 4 is an explanatory view of the balance in the aperture driving mechanism.

FIG. 4 explains the static force balance in the aperture driving mechanism.

The torque values, shown by three lines, are converted into values of the torque working on the rotation axis 140, provided with the frictional brake. The torque value $T_{FO}$ is setting value of slipping torque in the open direction frictional brake. The torque value $T_B$ is the value of torque for urging by means of the open direction urging spring 108 in the camera body 10. The torque value $T_L$ is the value of torque for urging in stop down direction by means of the urging spring 202 in the interchangeable lens 200. When the aperture motor 110 stops actuating, the condition for making it motionless is $T_{FO} > T_B - T_L$.

When the aperture motor 110 is actuating the aperture driving mechanism in the open direction, the torque ($T_{FO} - T_B + a_L T_L$) works. The value of a factor $a_L$ is determined, depending on the transfer efficiency from the rotation axis 140 to the lens 200, which relates to the hysteresis of forces occurred in charge and release directions. Note that $a_L > 1$.

On the other hand, when the aperture motor 110 is actuating the aperture driving mechanism in the stop down direction, the torque ($T_{FC} + a_B T_B - T_L$) works. Similarly, the value of a factor $a_B$ is determined, depending on the transfer efficiency from the rotation axis 140 to the third gear 160 provided with the open direction urging spring 108. Note that $a_B > 1$.

The value of loading torque in the open direction is determined, depending on the static balance of force automatically, and should be needed for actuating the aperture driving mechanism. In the open direction, $T_{FC} = 0$ may be acceptable in the extreme case, because the value of the torque $T_{FC}$ is not constrained statically.

Actually, it is difficult to provide a simple construction, in which friction acts during rotation in only one direction, because of restriction of mechanism. Therefore, two spring clutches 104, 106 with different slipping torque are set $T_{FO} \gg T_{FC}$, and thereby the aperture motor 110 can actuate the aperture member without prolonging the stop down period.

Figure 5:
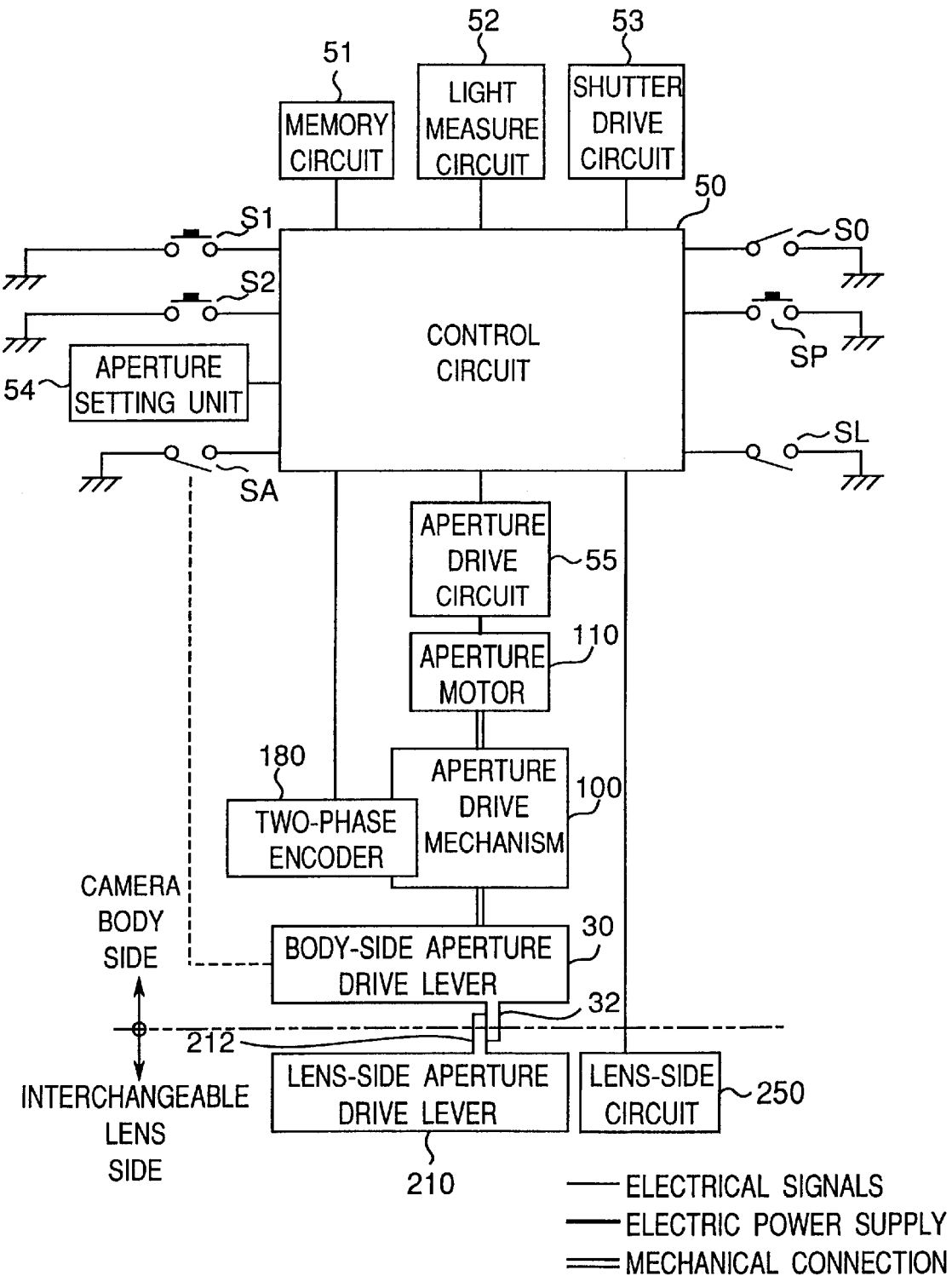
FIG. 5 is a block diagram of the control system.

FIG. 5 is a block diagram, showing the construction of the controlling system.

A control circuit 50 for controlling the camera generally, is connected to memory circuit 51 for storing program and data, light measure circuit 52 for light measurement, a shutter drive circuit 53 for driving a shutter, an aperture setting unit 54 for setting a value of the aperture, and an aperture drive circuit 55 for driving the aperture motor 110. Moreover, the control circuit 50 is connected to a start switch S1 which is switched on in response to halfway pushing of a shutter release button, a release switch S2 which is switched on in response to complete pushing of the shutter release button, an aperture open detect switch SA corresponding to the open detect switch 24 in FIG. 1, a main switch S0, a preview switch SP which is switched on in response to pushing of a preview button, a lens fix detect switch SL corresponding to the lens fixing operation detect switch 26 in FIG. 1, and a two-phase encoder 180 for detecting the rotation of the aperture driving mechanism 100. The control circuit 50 includes a CPU, timers, counters and so on.

Furthermore, if the interchangeable lens is attached to the camera body, the control circuit 50 is connected to a lens-side circuit 250 and the aperture driving lever 32 of the aperture drive ring 30 in the camera body engages the aperture driving lever 212 of the aperture drive ring 220 in the interchangeable lens.

Figure 6:
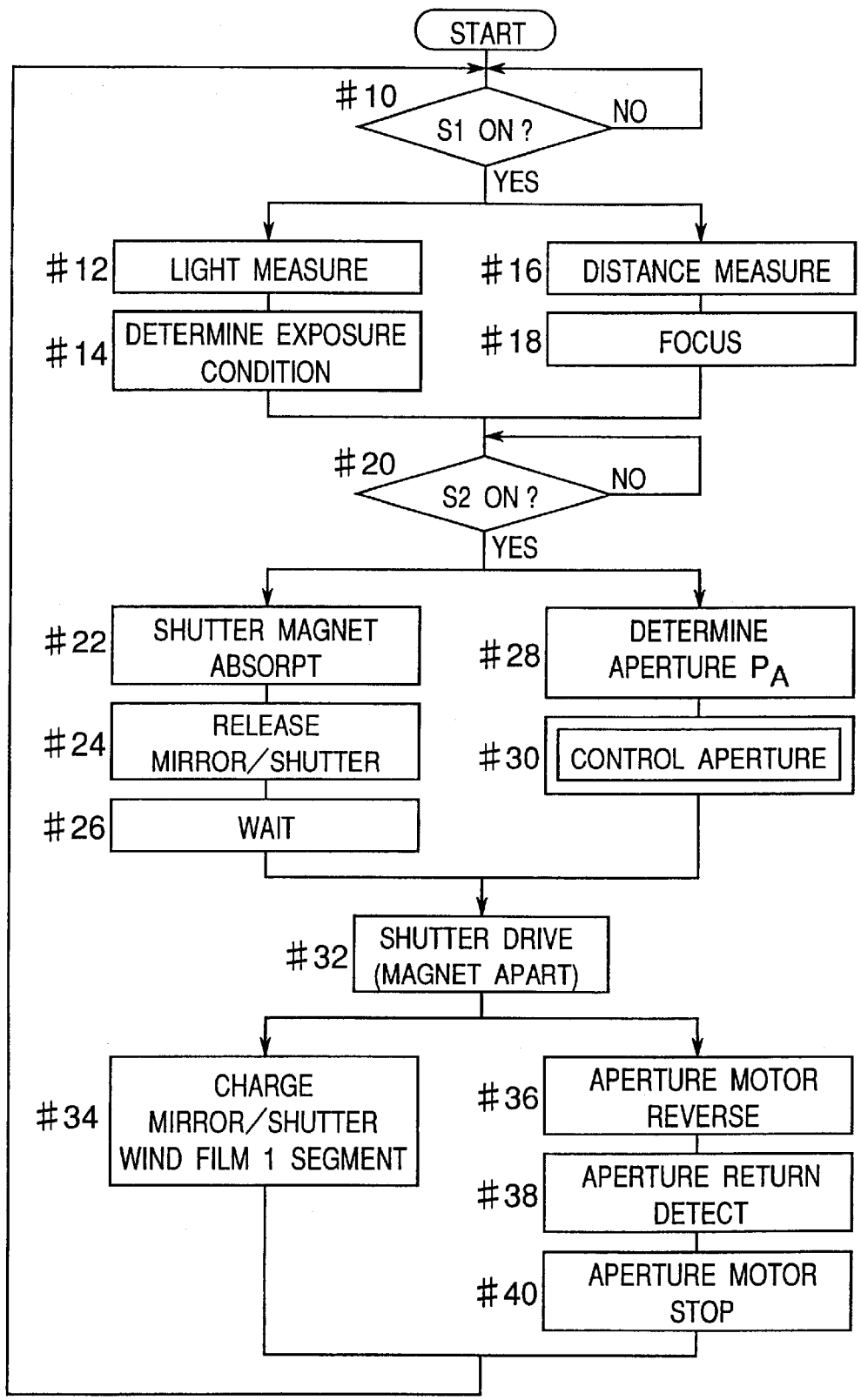
FIG. 6 is a flow chart for taking a frame of picture.

FIG. 6 shows a sequence of the camera at time of taking a picture.

First, turning "on" of the start switch S1 is awaited (#10). If the start switch S1 turns "on" (YES at #10), light is measured (#12) and the condition for exposure is determined depending on the result of the light measurement (#14). Simultaneously, the distance is measured (#16), and the lens is focused (#18).

Then, turning "on" of the release switch S2 is awaited (#20).

If the release switch S2 turns "on" (YES at #20), mechanical release operation before exposure is performed. Specifically, the shutter magnet attracts a engaging member of the shutter (#22), the engagement of the shutter is released and the mirror is moved upward (#24), and stopping of the vibration in the mirror is awaited in a predetermined time (#26). Simultaneously, the size of the aperture $P_A$ is determined (#28), and stop down control, as described hereafter, is performed (#30).

Then, a film is exposed. Specifically, the magnet for the shutter is released (stops to attract), and the shutter runs (#32).

Then, mechanical return operation after exposure is performed. Specifically, the mirror and the shutter are charged, and a frame of the film is wound up (#34). In the same time, the aperture motor 110 rotates in reverse direction (#36). After detecting complete return of the aperture member (#38), the aperture motor 110 stops rotating (#40). Complete return of the aperture member at the step #38 is detected, when the aperture open detect switch SA turns on and then the predetermined time $T_2$ is passed.

Figure 10:
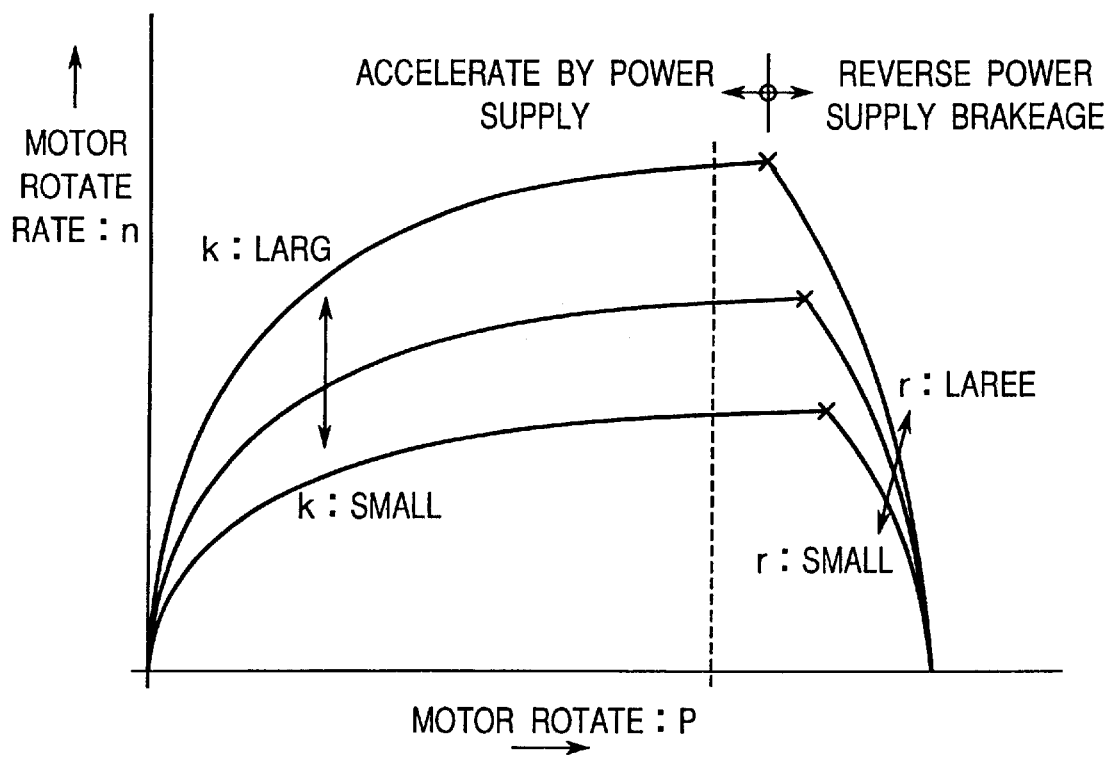
FIG. 10 is an explanatory view of the overrun.

FIG. 10 explains calculation of overrun in brake.

In the figure, the vertical axis indicates the rate "n" of rotation at which the aperture motor 110 is driven. The horizontal axis indicates revolutions "P" in which the aperture motor 110 is driven, that is, the amount of the pulses detected by the two-phase encoder 180. The lines in the figure show the accelerated condition after supplying the aperture motor 110 with power and the decelerated condition by reverse power supply brake. The symbol X indicates the starting point of reverse power supply brake. Accelerating and decelerating properties of the aperture driving differ with the condition of power supply, and the type of the lens attached to the camera body. The factors "k" and "r" represent those properties.

Specifically, revolutions (or amount of rotation) $P_{ac}$ during the accelerated condition by power supply is expressed approximately by the function f(k, t). That is, $$P_{ac}=f(k, t) \qquad (1),$$

in which the passing time "t" after start of power supply and the factor "k" are used.

Moreover, revolutions $P_{bk}$ during the decelerated condition by reverse power supply brake is expressed approximately by the function g(r, n). That is, $$P_{bk}=g(r, n) \qquad (2),$$

in which the rotate ratio "n" after starting reverse power supply brake and the factor "r" are used.

The factors "k" and "r" define the character of the curved lines shown in FIG. 10, and is related to the accelerating and decelerating character or properties in driving. These factors "k" and "r" are expressed with the inverse function i for f and with the inverse function j for g, as follows;

$$k=i(P_{ac}, t) \qquad (3)$$

$$r=j(P_{bk}, n) \qquad (4)$$

It is possible to detect the factor "k" according to the equation (3), therefore, by monitoring the time t and the motor revolutions P. Similarly, it is possible to detect the factor r according to the equation (4), by monitoring the rate n of rotation of the motor on starting reverse power supply brake and revolutions $P_{bk}$ of motor.

Specifically, the equation (1)–(4) is expressed in the form of a polynomial expression. For example, the equation (1) appears as $$P_{ac}=k(a_0+a_1t+a_2 t^2+ \ldots +a_n t^n),$$

in which predetermined coefficients $a_0$–$a_n$ are used.

The factors $k_0$ and $r_o$ are determined by driving the aperture member by a predetermined amount prior to an objective operation. Then, in the objective operation, the number of pulses and timer counter, that is, amount and time of actuating in drive unit, are detected at the position before brake point shown by the dotted line in FIG. 10, and then the factor k is calculated by the equation (3). Presuming that reverse power supply brake is used, there is correlation between accelerating and decelerating characters, as follows:

$$r/k=r_0/k_0 \qquad (5)$$

We therefore have the following equation.

$$r=(_0/k_0)k \qquad (6)$$

The overrun upon reverse power supply brake in the objective operation is calculated, using the factor r shown by the equation (6).

Figure 7:
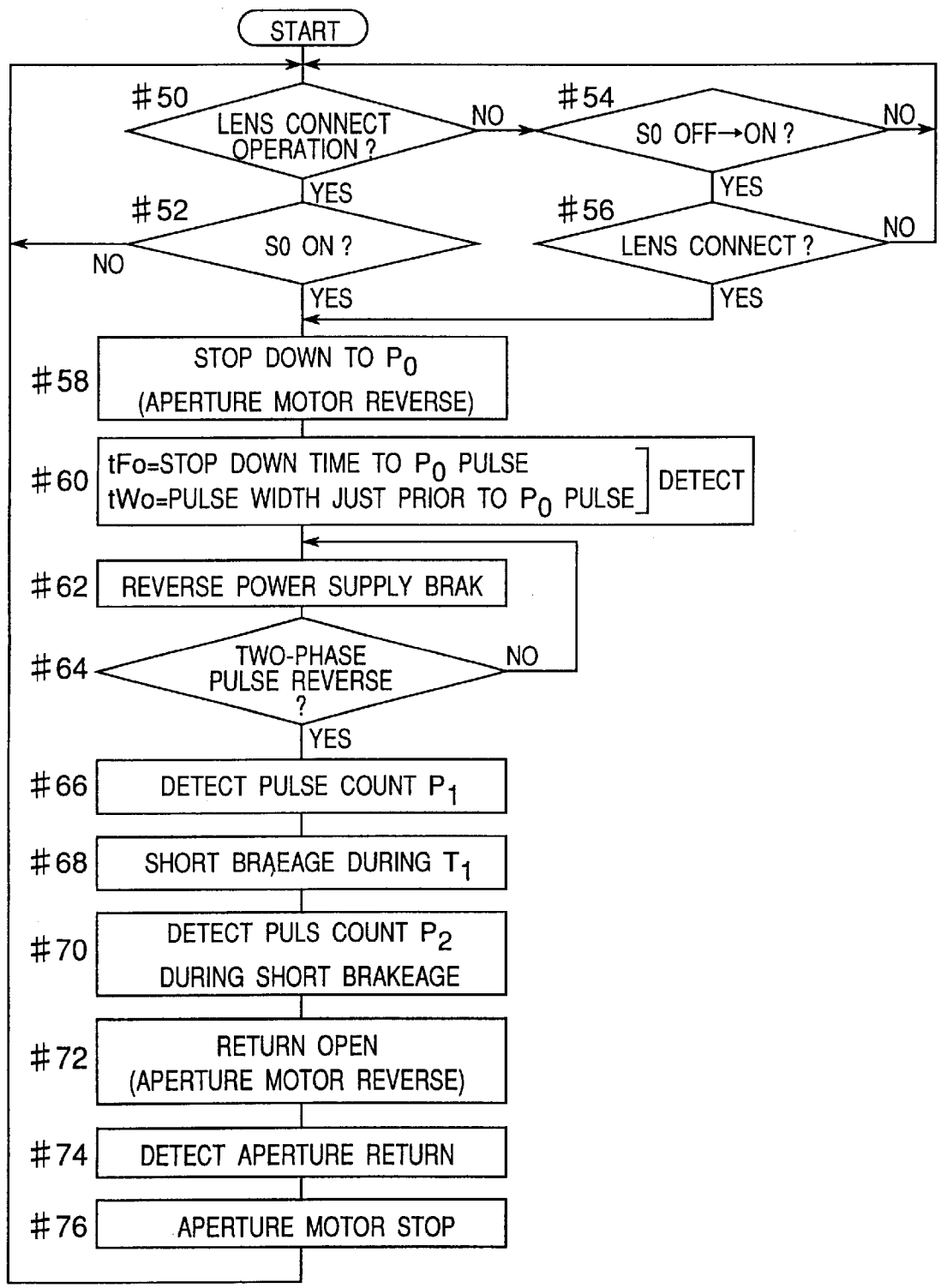
FIG. 7 is a flow chart showing resetting operation of the aperture.

FIG. 7 is the flow chart, showing a sequence of reset operation for the aperture member.

In the case that new interchangeable lens is attached to the camera body with the main switch S0 on (YES at #50, and YES at #52), or that the main switch S0 turns off with the interchangeable lens being attached to the camera body (No at #50, YES at #54, and YES at #56), the character of the driving mechanism is monitored by the preliminary operation.

Specifically, the aperture motor 110 is driven forward so as to stop down the aperture member, until the size of the aperture reaches to the predetermined size, that is, until the number of pulses detected by the two-phase encoder 180 reaches to $P_0$. The aperture stop down time $t_{FO}$ for attaining the number of pulses P0, and pulse width time $t_{WO}$ just prior to attaining the number of pulses $P_0$ are detected (#60). Then, the aperture motor 110 is applied with voltage in opposite phase for reversing it until the two-phase encoder 180 detects the reverse of two-phase pulses to apply the brake (#62, #64). After the reverse of the two-phase pulses is detected (YES at #64), the number of pulses $P_1$ during the reverse power supply is detected (#66), and the terminals of the aperture motor 110 are shorted for a predetermined time to apply the short brake (#68), and the number of pulses $P_2$, with a plus or minus sign, is counted during the short brake (#70).

After finishing the monitoring of the character, the aperture member is returned to the primal (or initial) position, or the open-end position.

Specifically, the aperture motor 110 is reversed (#72). In case that the predetermined time $T_2$ has passed after the aperture open detect switch SA turns on, the complete return of the aperture member is detected (#74), and the aperture motor 110 is stopped (#76).

Figure 8:
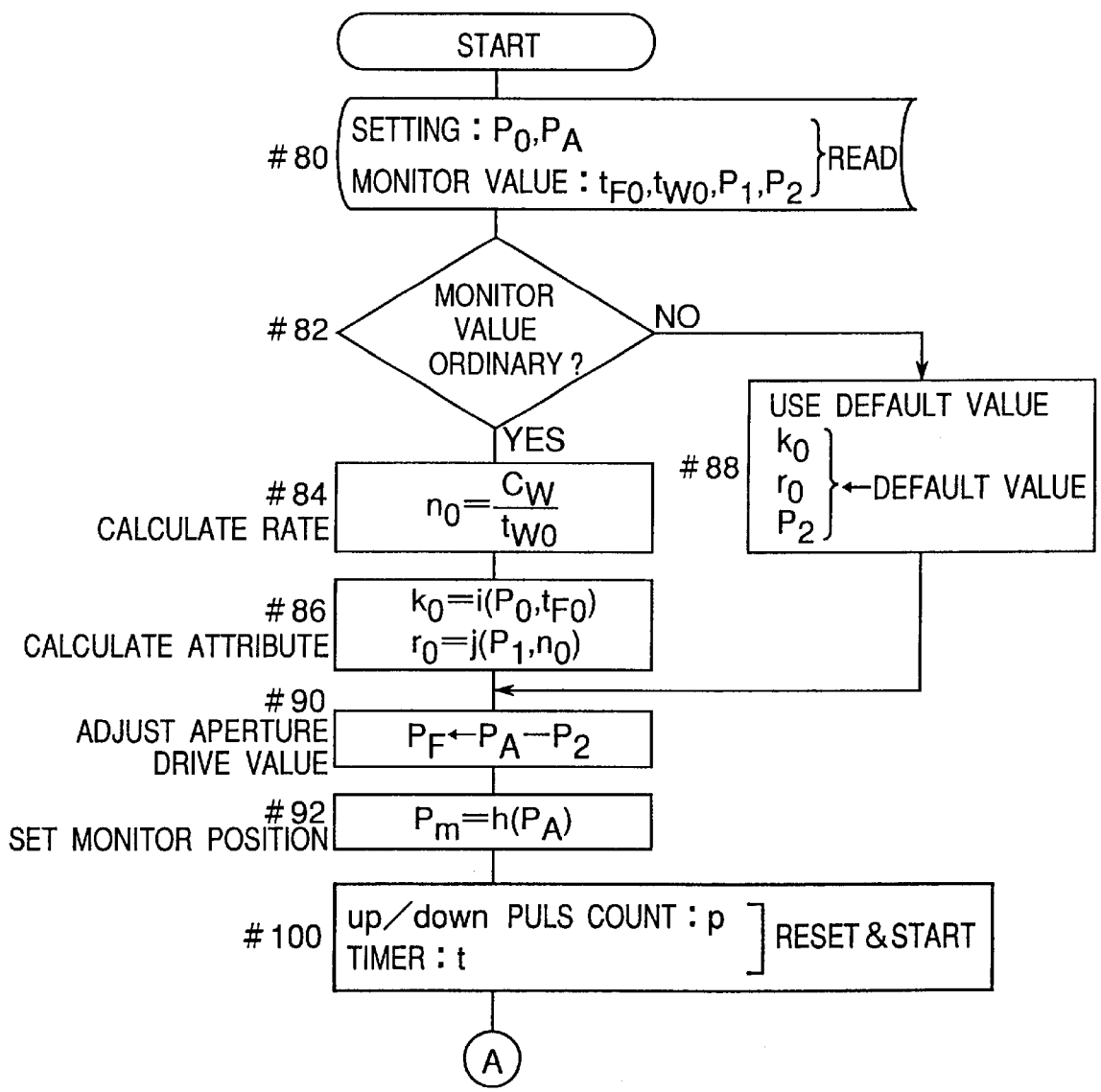
FIG. 8 is a flow chart showing operation executed just prior to stop down operation of the aperture.
Figure 9:
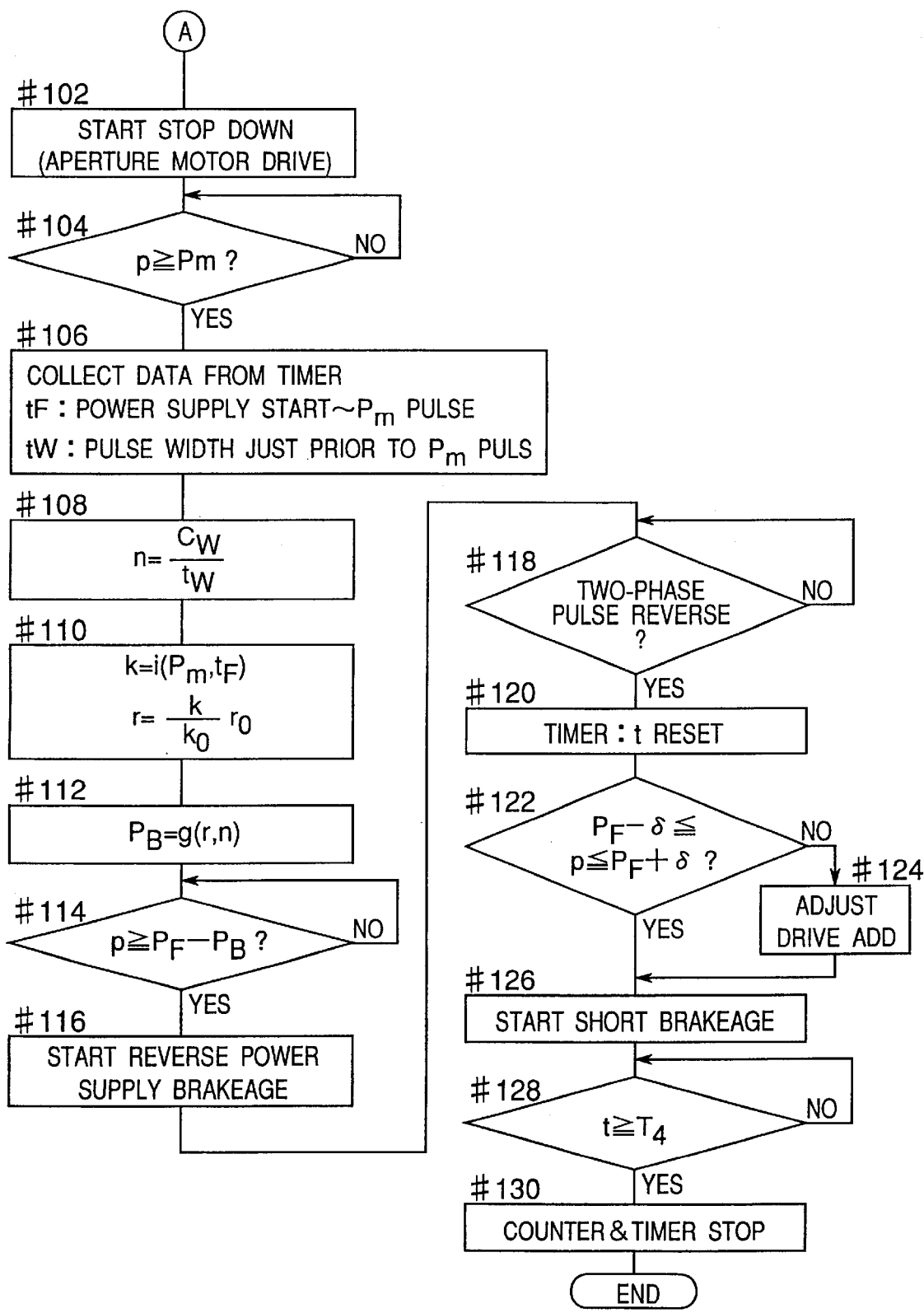
FIG. 9 is a flow chart showing stop down operation which follows to the flow chart shown in FIG. 8.

FIGS. 8 and 9 are flowcharts, showing the sequence of the calculation just prior to stop down driving of the aperture.

First, the setting values $P_0$, $P_A$ and the monitoring values $t_{FO}$, $t_{WO}$, $P_1$, $P_2$ are read out (#$^{80}$), and it is determined whether the monitoring values $t_{FO}$, $t_{WO}$, $P_1$, $P_2$ are within the ordinary range, or within the predetermined range thereof (#82).

If the monitoring values $t_{FO}$, $t_{WO}$, $P_1$, $P_2$ are included in the predetermined range and are not exceptional (YES at #82), the rate $n_0$ is calculated (#84) and the character values $k_0$, $r_0$ are calculated (#86). If any one of the monitoring values $t_{FO}$, $t_{WO}$, $P_1$, $P_2$ is out of the ordinary range (NO at #82), default values are used for $k_0$, $r_0$, $P_2$ (#88).

Then, the value $P_F$ for driving the aperture member is adjusted to $P_A-P_2$ (#90), and monitoring position Pm is set (#92). Thereafter, an up/down pulse counter p and a timer t are reset and started.

Then, the aperture member is driven to be stopped down. Specifically, the aperture motor 110 is driven forward to the stop down of the aperture member, until the pulse counter p counts Pm (#104).

If the pulse counter p counts Pm (YES at #104), the character during an objective controlling is monitored. Specifically, the time $T_F$ required from starting of the power supply to reaching Pm pulses, and the pulse width time $t_W$ just prior to reaching Pm pulses, are attained by means of the timer (#106), the rate n is calculated (#108), the accelerate and decelerate character values k, r are calculated (#110), and exceptional overrun pulse $P_B$ is calculated (#112). The stop down operation is continued until the pulse counter p attains the exceptional overrun pulse $P_B$ short of adjustment objective point (or compensation objective point) $P_F$ (#114).

After stopping down the aperture, the brake is applied. Specifically, if the pulse counter p attains the exceptional overrun pulse $P_B$ short of adjustment objective point $P_F$ (YES at #114), the reverse power supply brake is applied (#116), until the two-phase pulses reverses (#118). If it is detected that the two-phase pulses reverse (YES at #118), only the timer t is reset to "0" (#120) in order to wait until the predetermined time $t_4$, as detail is described below, has passed after detecting the reverse of the two-phase pulses.

Then, it is decided whether the pulse counter p is in the permissible range of "$P_F$+/−delta" (#122). If it is not in the permissible range (NO at #122), additional driving operation is performed for its adjustment (·124). The delta is a value corresponding to a half of a tolerance range of stopping position. The objective range of stopping position is expressed as "$P_A$+/−delta".

Then, no action is performed until the aperture member became stable. Specifically, the short brake is started (#126), and the timer t continues to count up to the predetermined time $T_4$, which is referred as aperture stable waiting time (#128). If the timer t counts over the predetermined time $T_4$ (YES at #128), the counter and the timer are stopped (#130).

Figure 11:
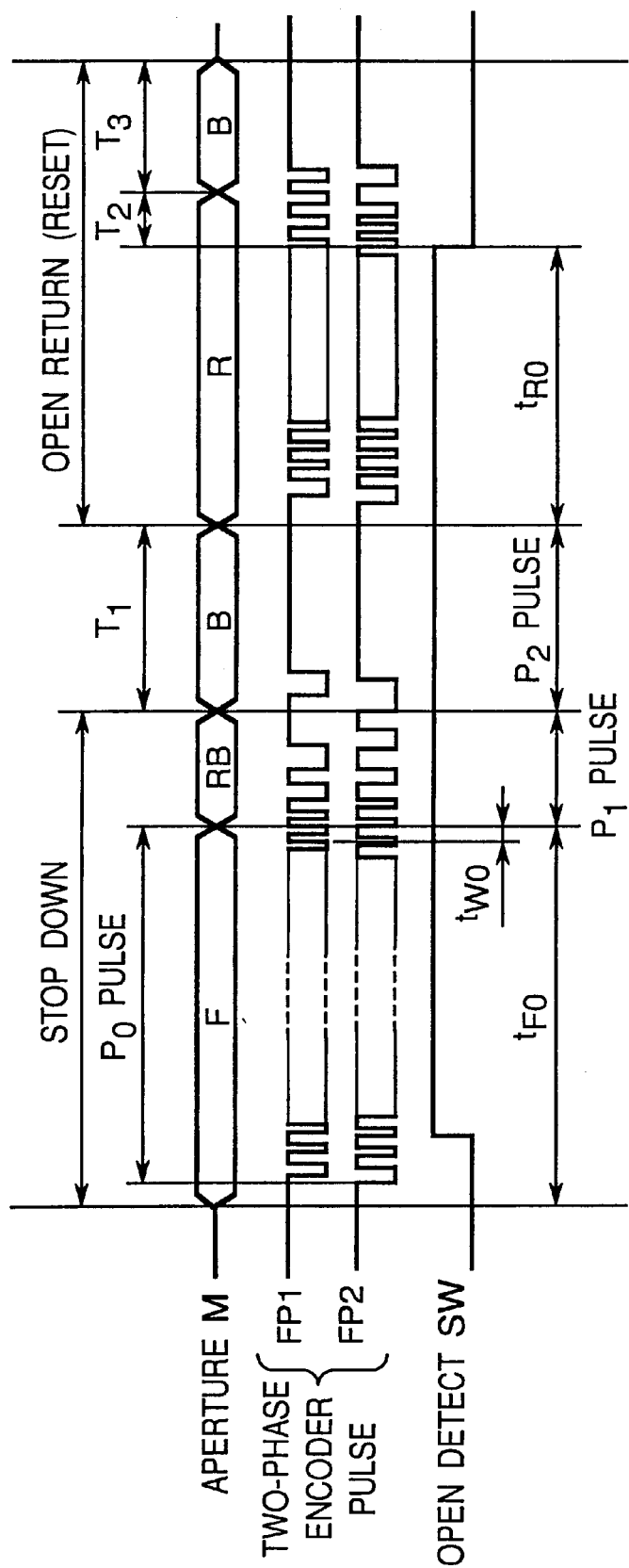
FIG. 11 is timing chart showing resetting operation.

FIG. 11 is a flowchart (or timing-chart), showing the sequence of the reset action in a normal condition. When the power supply is on and the lens is attached, the aperture-reset action is performed along with monitoring of the aperture running character. The value monitored is used for controlling the aperture member. In the initial condition, the aperture open detect switch is on. In abnormal case that the aperture open detect switch is off in the initial time, the aperture open reset action is performed before the above sequence. As for the aperture motor, forward rotation is indicated as "F", reverse rotation is indicated as "R", and the reverse power supply brake is indicated as "RB".

Figure 12:
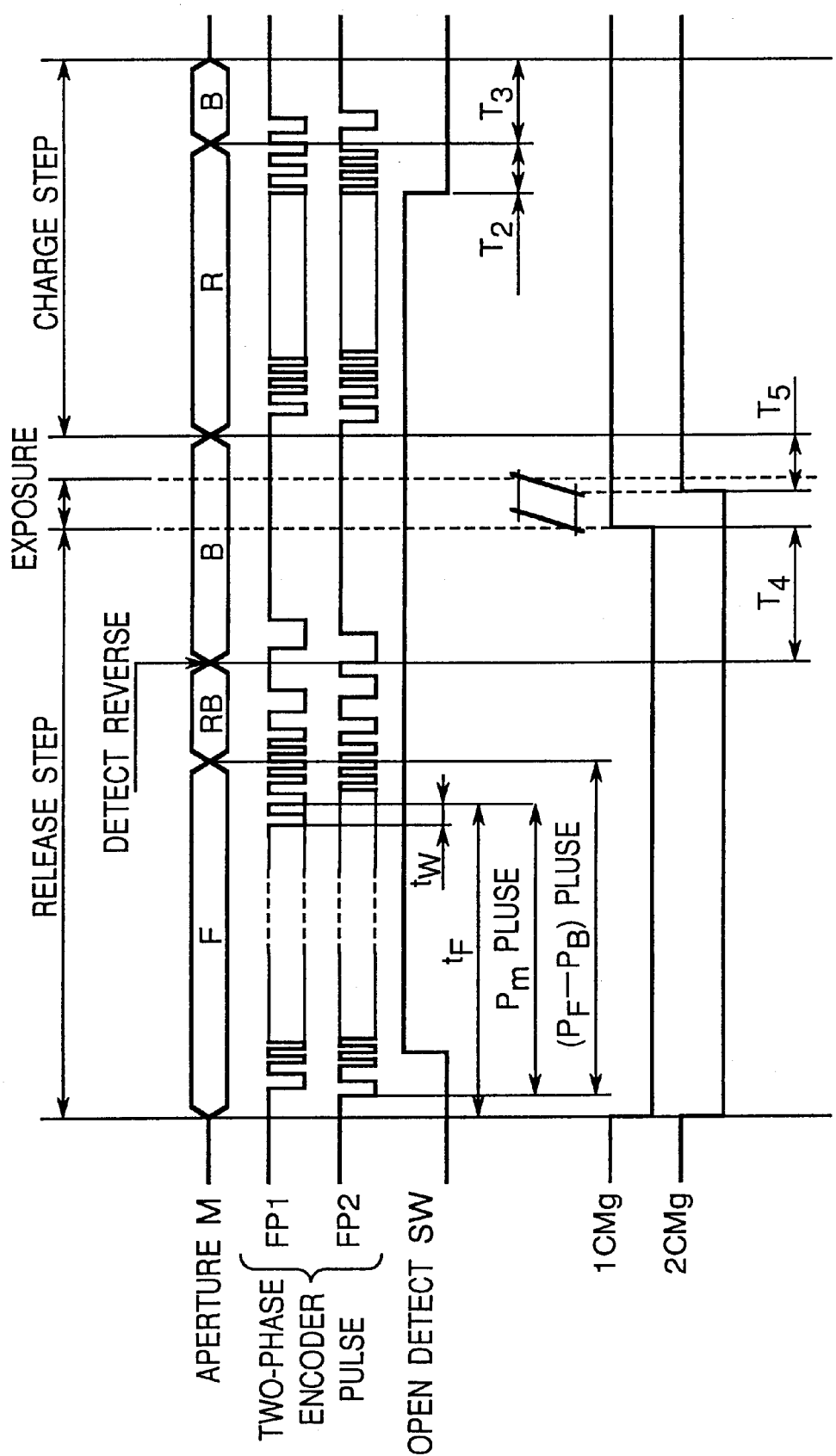
FIG. 12 is a timing chart.

FIG. 12 is a flowchart (or timing-chart), showing the sequence of taking a frame of picture. In the figure, $T_2$ is power supply continuing time for ensuring the mechanical contact at the open end. $T_4$ is a time for waiting until the aperture bounding become stable. One of $T_2$ and $T_4$, which is later than the mirror release stabilized time, is used. As for the aperture motor, forward rotation is indicated as "F", reverse rotation is indicated as "R", and the reverse power supply brake is indicated as "RB".

Figure 13:
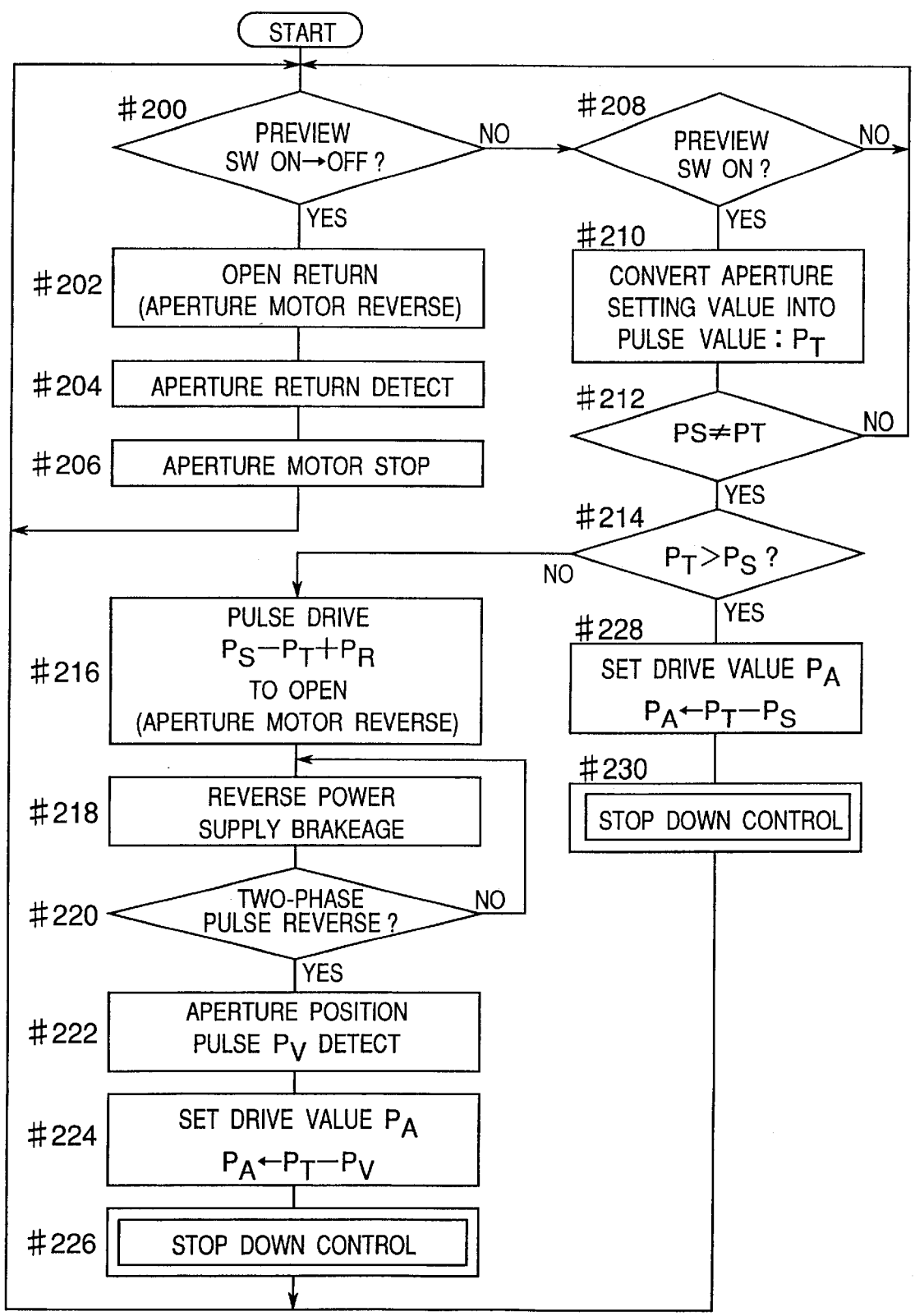
FIG. 13 is a flow chart on preview operation.

FIG. 13 is a flowchart, showing the sequence of the preview operation.

When the preview switch is on (NO at #200, and YES at #208), the value of the aperture, set by aperture setting value input equipment 54 in the camera body, is converted into the number of pulses $P_T$ (#210). It is decided whether the number of pulses $P_T$ is equal to the number of pulses $P_S$, indicating the present position of the aperture, or not (#122). If the number of pulses $P_T$ is equal to the number of pulses $P_S$ (NO at #212), the step returns to the start.

If the number of pulses $P_T$ is not equal to the number of pulses $P_S$ (YES at #212), or if the number of pulses $P_T$ is less than the number of pulses $P_S$ (NO at #214), the size of the aperture is set in the open direction from that set by the camera body, and thereafter the aperture is driven in the stop down direction, so that the size of the aperture become that set by the camera body. Specifically, the aperture motor 110 is reversed in the open direction by the number of pulses "$P_S-P_T+P_R$" (#216), and then the reverse power supply brake is applied until the two-phase pulses are reversed (#218, #220). After the two-phase pulses are detected to reverse (YES at #220), the aperture position pulse $P_V$, which is equivalent to the position of the aperture when the two-phase pulses are reversed, is detected, the driving pulses $P_A$ is set to "$P_T-P_V$" (#224) and stop down control similar to that shown in FIGS. 8 and 9 is performed (#226). After the step #226, it is returned to the start. Note that $P_R$ is the number of pulses set for overrun in the open direction driving and that $P_A$ is the number of pulses equivalent to pulses for driving in stop down control.

If the number of pulses $P_T$ is not equal to the number of pulses $P_S$ (YES at #212), or if the number of pulses $P_T$ is greater than the number of the pulses PS (YES at #214), the number $P_A$ of pulses for driving is set to "$P_T-P_S$" (#228), and the stop down control, as well as in FIGS. 8 and 9, is performed (#228), and it is returned to the start.

If the preview switch changes from "on" to "off" (YES at #200), the aperture motor 110 is reversed in rotation so that the aperture returns to the open position (#202). After detecting the complete return of the aperture member (#204), the aperture motor 110 is stopped (#206).

As described above, the camera to which the interchangeable lens having the aperture blades driving mechanism urged in one direction by a urging spring is attached, has the associated mechanism, which engages the lens-side mechanism and is provided with the urging spring resisting the urging force from the lens-side mechanism, the frictional brake mechanism, and the motor for driving the aperture in both stop down and open directions. Thus, the aperture mechanism at low cost which can be actuated continuously without resetting operation for each stop down operation, is realized.

The aperture mechanism in the interchangeable lens, which has blades drive mechanism with urging spring, is held on the initial position by itself. Therefore, the lens is not necessary to have any alignment or buffer component for precise connection to the camera body, and may have a simple mechanism, such as a mechanism urging in one direction. Since the camera body is provided with the urging spring against the spring urging mechanism of the interchangeable lens, it is possible to reduce the difference in motor loading torque between forward and reverse directions (or stop down and open return directions). Thus, it is prevented that the restriction for driving in one direction, in which the motor loading torque is relatively large, causes the driving rate in another or reverse direction extremely slow. The aperture driving mechanism with spring urging mechanism needs the static force for keeping the position thereof after stopping to drive the aperture member and thereby has frictional brake mechanism to produce the static force. Therefore, it is possible to drive the aperture member to any position in any direction only by the motor, without engaging or releasing action such as that in engagement mechanism. Thus, continuous driving, which is one advantage of the motor driving mechanism, is adapted to the aperture driving mechanism by a simple modification of mechanism in the camera body.

Moreover, as for the interchangeable lens suitable for the system "in which stop down driving member actuated by the spring in the camera body, is stopped by means of putting the engage member into running stop down driving member", the construction or mechanism for continuously driving the aperture member, is attained without damaging the basic performance of the aperture member.

Furthermore, as described above, the camera driving the aperture member in the interchangeable lens attached therewith through the associate mechanism by means of the motor in the camera body, resets the aperture member in the lens to the initial position upon the attachment of the lens or the detection of power supply, and simultaneously starts to monitor the drive and brake thereof by driving by a predetermined amount actually. As for the actual control of stop down, the accelerating character is monitored during the power supply for driving the aperture member to the predetermined position prior to driving it the object position (or target position), and then the point for starting to apply the brake responding to the monitored accelerate character and the monitored character of the motor on the reset operation, are determined so as to stop the aperture member at the object point.

Thus, the character of the driving mechanism, included not only in the camera body but in the interchangeable lens, is monitored in the reset operation, before the actual stop down actuation, in which accuracy on stop position is needed, so that the variation of the loading condition including the lens-side and the effect of the variation of the power supply condition for motor drive is possible to be grasped. AS for the actual stop down operation, the accelerating character is monitored during supplying the motor with electricity, so that it is possible to adjust the point to start braking depending on the attached lens, considering the difference of the power supply from that in the reset operation, so as to reduce the variation of the aperture stop position.

By means of the above controlling method, it is not needed to make the reduction ratio of the aperture driving mechanism so large, thus possible to neglect the effect of the load. Therefore, it is possible to reduce the revolution (i.e. amount of rotation) of the output axis of the motor for stopping down the aperture member in a set amount, and to make the time for stopping down shorter. In other words, it is possible to overcome the disadvantage of long drive time in the motor drive, and to receive the advantage of the continuous drive therein.

Although the present invention has been fully described in connection with the preferred embodiment thereof with reference to the accompanying drawings, it is to be noted that various changes and modifications are also apparent to those skilled in the art.

For example, it is possible to apply the present invention not only to the aperture driving mechanism in the interchangeable lens, but to the other mechanism, such as the focus driving mechanism in the interchangeable lens and the film feeding mechanism in the camera body.

What is claimed is:

1. A camera adapted to attach a lens thereto, comprising:
    a lens attached part for attaching the lens thereto;
    a drive unit for driving a driven member in the lens attached to the lens attached part;
    a detector for detecting the operating characteristics of the drive unit; and
    a control unit for controlling the drive unit, wherein the control unit includes a preliminary drive control unit for driving the drive unit so as to drive the driven member in the lens by a predetermined amount with a predetermined timing, as a preliminary operation, and for making the detector detect the operating characteristics of the drive unit during the preliminary operation, and wherein the control unit controls the drive unit on the basis of the operating characteristics detected by the detector, as a main operation.

2. The camera as claimed in claim 1, wherein the control unit makes the detector detect at least one of the operating characteristics during the main operation, and wherein the control unit controls the drive unit with reference to the at least one of the operating characteristics.

3. The camera as claimed in claim 1, wherein the driven member is a member included in a mechanism for changing the size of an opening of an aperture in the lens attached to the lens attached part.

4. The camera as claimed in claim 1, in which the predetermined timing corresponds to when it is detected that the lens is attached to the lens attached part.

5. The camera as claimed in claim 1, in which the predetermined timing corresponds to when the electric power starts to be supplied to a camera body.

6. The camera as claimed in claim 1, in which the predetermined timing corresponds to when a power switch on a camera body is switched on.

7. The camera as claimed in claim 1, wherein the detector detects the amount and time of operation of the drive unit, and wherein the operating characteristics are those concerning the acceleration and deceleration of the drive unit, including a mechanical deflection and deviation.

8. A method for controlling an apparatus adapted to attach a unit thereto, comprising:
    a preliminary driving step for driving from the apparatus, a driven member of the unit attached to the apparatus, by a predetermined amount with a predetermined timing as a preliminary driving operation;
    a detecting step for detecting, in the apparatus, operating characteristics of a mechanism in the apparatus for driving the driven member during the preliminary driving operation; and
    a main driving step for driving the driven member of the unit as a main driving operation from the apparatus, on the basis of the operating characteristics detected in the detecting step.

* * * * *